United States Patent Office 3,035,930
Patented May 22, 1962

3,035,930
ASPHALT COMPOSITIONS
Samuel K. Talley, Berkeley, Calif., assignor to Shell Oil
Company, a corporation of Delaware
No Drawing. Filed Jan. 28, 1954, Ser. No. 406,902
12 Claims. (Cl. 106—273)

This invention is concerned with improved asphalt compositions. More particularly, it is directed to asphaltic compositons and compositions of other bituminous materials having substantially improved consistency and other properties both at high and low temperatures.

The utilization of bituminous materials for many purposes is limited by their tendency to flow at high temperatures and by their inclination to become brittle at lower temperatures. These properties may be modified to a very limited extent by the inclusion of several well known materials such as petroleum cutter stocks and the like. In most cases it has been necessary only to use limited proportions of a mineral lubricating oil as a cutter stock in order to provide improved low temperature properties. On the other hand, it has been found that this improvement is limited to the range of temperatures above the pour point of such oils.

The high temperature viscosity of asphalts has been altered by the addition thereto of gelling agents such as clays, onium clays, and inorganic colloids such as silica. However, the addition of these materials does not alter the low temperature properties of the resulting compositions. Moreover, the viscosity and other properties of an asphalt at the burning temperatures thereof has never been of any particular concern.

The necessity for flexibility at extremely low temperatures, in the order of —40° F. and below, is becoming increasingly urgent, as is the maintenance of proper viscosity and structural stability at relatively elevated temperatures such as occur at a burning face of a composition wherein at least part of the fuel comprises a bituminous substance. Investigation has shown that molded compositions comprising bituminous materials either in the presence or absence of additional fillers or combustible materials burn at a relatively low rate and eventually the flame becomes extinguished. Photographic examination of such compositions taken during and after the burning period has shown that the reason for this adverse rate of burning and the snuffing action is the melting of the bituminous substance to form a liquid layer at the burning face, thus cutting the flame from the rest of the molded, pliable plastic burning composition, which normally contains an additional combustible material or oxidizing agent.

It is an object of the present invention to provide improved bituminous materials. It is a further object of this invention to provide bituminous compositions having improved extreme low temperature properties. It is a further object of the invention to provide bituminous compositions having reduced tendency to flow at a burning interface. Other objects will become apparent during the following discussion.

Now, in accordance with this invention, it has been found that bituminous compositions may be improved both with respect to extremely low temperature properties and with respect to viscosity and consistency properties at temperatures of a burning interface by modification of a bituminous substance (having a penetration at 77° F. less than 20 dmm.) with at least about 20% by weight of an organic ester having a pour point lower than about —40 and a boiling point higher than about 300° F. at 1 mm. Hg, with the further modification by a substantially infusible colloidally dispersed gelling agent for the composition, said gelling agent being present in an amount sufficent to substantially raise the viscosity of the composition at temperatures above about 350° F. More particularly, optimum compositions are obtained by the combination of a hard asphaltic material (having a penetration less than about 10 dmm. at 77° F.), between 25 and 50% by weight of an ester of the group consisting of aliphatic esters of dicarboxylic acids, organic phosphorus esters, and organic silicates.

Still in accordance with the present invention, it has been found that the softening point and penetration of the above types of compositions may be varied independently of each other by combining two or more of the esters, at least one of which is highly compatible with the remaining ingredients of the composition and the other of which has little or no compatibility therewith. More specifically, it has been found that combinations of the aliphatic esters of dicarboxylic acids with organic esters of silicic acid provides great latitude in the independent variation of softening point and penetration of the resulting compositions.

The bituminous substances which may be employed in the subject compositions comprise for the most part those of petroleum origin or derived from coal tar or coal tar pitch. The essential requirement for the compositions under consideration is that the bituminous substance have an ASTM penetration at 77° F. (5 seconds, 100 grams load) less than about 20 dmm., and preferably less than about 10 dmm. The bituminous materials also should have an ASTM ring and ball softening point between about 150 and about 300° F., and preferably between 175 and 225° F. Suitable materials may be prepared by the use of one or more asphaltic or coal tar components and may be either blown or unblown petroleum products. An asphalt suitable for the present purpose may be prepared, for example, by the air blowing of either distilled or residual petroleum fractions. For example, short residue, bulk distillates, lubricating oil extracts, or bright stocks may be blown to suitable asphaltic compositions having the desired penetration range. Preferably the starting material contains only a minor amount of aromatic fractions, and short residues obtained from the West Texas and Ellenberger fields are preferred. It is still more preferred that asphalts are employed having softening points above about 285° F. and are the dewaxed residue of paraffinic crude. In addition to the asphalts and coal tar pitches suitable for use in these compositions asphaltites such as gilsonite and grahamite may be employed either as the sole bituminous substance or in combination with one or more of the above substances.

THE ESTERS

Phosphorus esters useful for the liquid component in the present compositions comprise the normally liquid aliphatic esters of acids of phosphorus. While the trialkyl phosphates are particularly preferred, other classes are suitable in addition to or in place of said phosphates. These include aryl phosphates, aryl alkyl phosphates, dialkyl hydrocarbon phosphonates, especially dialkyl alkanephosphonates, alkyl dialkanephosphinates, diphosphorus compounds such as bis(dialkyl phosphono) alkanes, bis-(alkyl alkane phosphino)alkanes, alkane diol bis(dialkane phosphinate), alkane dio bis(dialkyl phosphates), alkane diol bis(alkyl alkane phosphonates) and the corresponding ethers of the above diphosphorus compounds. Classes of the latter which are included are bis(dialkyl phosphono alkyl) ethers, bis(alkyl alkanephosphinico alkyl) ethers and bis(dialkyl phosphato alkyl) ether.

The phosphorus esters which are particularly useful in these compositions ordinarily have a total of at least 18 carbon atoms per molecule; preferably this total is between about 20 and about 32 carbon atoms per molecule. Typical trialkyl phosphates which are especially suitable contain alkyl radicals having from about 6 to about 12 carbon atoms each and include the following:

Trihexyl phosphates
Triheptyl phosphates
Trioctyl phosphates, e.g., tri(2-ethylhexyl)phosphate or tri(isooctyl)phosphate
Trinonyl phosphates, e.g., tri(3,5,5-trimethylhexyl)phosphate
Tridecyl phosphates
Tridodecyl phosphates
Dihexyl octyl phosphate Typical species of phosphonates and phosphinates are given below.

Dialkyl hydrocarbonphosphonates:
    Di(2-ethylhexyl)hexanephosphonate
    Dihexyl hexanephosphonate
    Dioctyl 3,5,5-trimethylhexanephosphonate
    Dihexyl benzenephosphonate
Alkyl dialkanephosphinates:
    Butyl di(2-ethylhexane)phosphinate
    Hexyl diheptanephosphinate Referring now to the diphosphorus compounds, these may be represented with the following general formula:

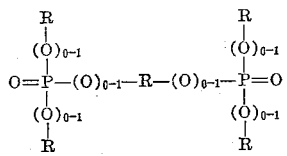

wherein each R is an aliphatic hydrocarbon radical.

The above classification of diphosphorus compounds includes especially substituted aliphatic hydrocarbons bearing 2 phosphorus radicals in the form of phosphate, phosphonate, phosphinate, or phosphine oxide groups. One of the more preferred classes of liquids suitable for use, according to the present invention, includes the bis(dialkyl phosphono)alkanes. These have the general configuration of

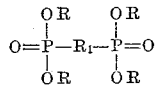

Preferably $R_1$ in the above formula is an alpha,omega-alkylene hydrocarbon radical of at least 3 carbon atoms. Each of the other R substituents may be a hydrocarbon radical of such nature that the entire compound is substantially fluid at operating temperatures. Preferably each of these groups contains from 3 to 9 carbon atoms each, and still more preferably at least two of them are of branched configuration. The following suitable species are typical of this presented configuration:

Bis-1,3-(diisobutyl phosphono)propane
Bis-1,4-(diisopropyl phosphono)butane
Bis-1,5-[di(3-methylbutyl)phosphono]pentane
Bis-1,6-[di(2-ethylhexyl)phosphono]hexane
Bis-1,3-[di(3,5,5-trimethylhexyl)phosphono]propane The alkylene group separating the two phosphorus radicals may be shorter than about 12 carbon atoms or may be of branched configuration as typified by the following species:

Bis-1,2-(di-tert-butyl phosphono)ethane
Bis-1,2-(di-tert-butyl phosphono)-3,4-dimethylpentane
Bis-2,4-(di-sec-butyl phosphono)-3,5-dimethylhexane
Bis-1,6-(di-n-pentyl phosphono)-3,4,5-trimethylhexane Another suitable subgeneric group of phosphorus compounds useful in the practice of this invention comprises the alkanediol bis(dialkane phosphinates). These materials have the general configuration:

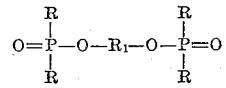

The preferred configurations and carbon contents of the individual portions of this and the following classes are in general those given in the foregoing description of the bis(dialkyl phosphono)alkanes except where especially noted. Preferably the substituent $R_1$ contains from 3 to 9 carbon atoms while the remaining R's have from 4 to 9 carbon atoms each. The following species are typical of this class:

1,5-pentanediol bis-[di(2-ethylhexane)phosphinate]
1,6-hexanediol bis-[di-2-isobutane)phosphinate]
1,7-heptanediol bis(di-n-butanephosphinate)
3,4-heptanediol bis-[di(3,5,5-trimethylhexane)phosphinate]
2,5-hexanediol bis-(dipentanephosphinate)

Another class of useful diphosphorus derivatives includes the alkanediol bis-(dialkyl phosphates) having the following general configuration:

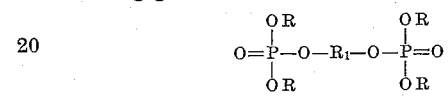

The following list of suitable species illustrates this group:

1,6-hexanediol bis(dibutyl phosphate)
3-methyl-1,6-hexanediol bis(di-tert-butyl phosphate)
2,3-diethyl-1,6-hexanediol bis(di-sec-amyl phosphate)
2,4,4-trimethyl-1,5-pentanediol bis(di-3,5,5-trimethylhexyl phosphate)
1,4-butanediol bis(diisopropyl phosphate)

Another subgeneric class constitutes alkanediol bis(alkyl alkanephosphonates) which have the general configuration:

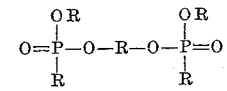

The suitable species which follow illustrate the nature of this class:

1,5-pentanediol bis-(butyl butanephosphonate)
1,4-butanediol bis-(tert-butyl-2-methyl-1-propanephosphonate)
1,6-hexanediol bis-(3,5,5-trimethylhexyl butanephosphonate)
3,4-dimethyl-1,6-hexanediol bis-(tert-amyl-pentanephosphonate)
1,2-ethanediol bis-(3,5,5-trimethylhexyl butanephosphonate)

It will be understood that symmetrical compounds are not necessary for the operation of the present invention. For example, the various substituents denoted as R in the above general formulae may vary within a given compound, both with respect to carbon atom content and to spatial configuration. The branched configurations are favored due to their generally superior effect upon the lubricating characteristics, especially at low temperatures. Unsaturated hydrocarbon radicals are especially to be desired when they are directly attached to a phosphorus atom since their presence has been found to improve the corrosion characteristics of lubricants prepared therefrom.

Details of the preparation and properties of these and other ethers will be found in copending application Serial No. 214,432, filed March 7, 1951, by Denham Harman et al.

Organic silicate esters may be employed in place of or in addition to phosphorus esters. The silicate esters include alkyl, aryl, aralkyl and alkylaryl esters of silicic acid. Typical species within this classification include the following:

Tetra(2-ethylhexyl)silicate
Tetra(n-hexyl)silicate
Bis(2-ethylhexyl)bis(3-methylhexyl)silicate
Tetraphenyl silicate Tetra(2-ethylphenyl)silicate
Tetracresyl silicate
Tetra(tridecyl)silicate
Tetra(decyl)silicate
Tetra($C_8$ Oxo alcohol)silicate In addition to the types of esters defined hereinbefore a particularly desirable type may be prepared by esterification of silicic acid, phosphorus acids or dicarboxylic acids with sulfur-containing alcohols which may be either thia-alcohols or thio-alcohols. Thia-alcohols are readily prepared by condensation of an unsaturated alcohol, such as allyl alcohol or vinyl alcohol, with mercaptans such as methyl, ethyl, propyl, amyl, hexyl, 2-ethylhexyl, etc., mercaptans. The resulting thia-alcohols are exemplified by 4-thiaoctyl alcohol, 3-thiaoctyl alcohol, 6-ethyl-3-thiaheptyl alcohol, 7-methyl-4-thiaoctyl alcohol, 5-ethyl-4-thiahexyl alcohol and 4-thiahexyl alcohol. Typical esters prepared by the esterification of silicic acid with these alcohols include the following: Tetra(4-thiaoctyl)silicate, tetra(7-methyl-3-thiaoctyl)silicate, tetra(6-ethyl-3-thiaheptyl)silicate, tetra(7-methyl-4-thiaoctyl)silicate, tetra(5-ethyl-4-thiahexyl)silicate and tetra(4-thiahexyl)thiosilicate. The corresponding esters may also be prepared by the esterification of phosphorus or dicarboxylic acids with the same type of alcohols. The esters so prepared exhibit excellent extreme pressure properties and a high response to the present combined additives.

Another preferred type of ester comprises those formed by the complete esterification of aliphatic polycarboxylic acids such as disclosed in U.S. Patent 2,481,372 to Von Fuchs et al.

Compounds characterizing the esters of the present invention include, for example, di(2-methylheptyl)adipate, di(3-ethylhexyl)adipate, dioctyl phthalate, dihexyl pimelate, di(3-methylheptyl)pimelate, di(3,3-diisopropylhexyl) pimelate, di(2-ethylhexyl)sebacate, polyallyl pelargonate, polyallyl caprylate, polyvinyl pelargonate, polyvinyl caprylate, as well as their homologs, analogs and derivatives. Triesters exemplified by trioctyl aconitate and hexatrioltricaproate are suitable as well. Esters of mono- and poly-basic acids with polyhydric alcohols may be stabilized in a like manner. These include, for example, esters of fatty acids and alkylene glycols (e.g., ethylene glycol diester of capric acid) and pentaerythritol esters.

The esters employed in the subject compositions are to be present in amounts of at least 20% by weight based on the bituminous material and preferably in amounts between about 25% and about 65% by weight thereof. In order to obtain the desired extreme low temperature properties referred to hereinbefore, the esters should have pour points lower than about —40° F. and preferably below about —60° F. Also, in order to provide suitable characteristics at relatively elevated temperatures the esters should have boiling points higher than 300° F. at 1 mm. Hg pressure but preferably lower than about 450° F. at 1 mm. Hg pressure.

It has been found, as referred to briefly hereinbefore, that combinations of an ester relatively compatible with asphalts and a second ester relatively incompatible therewith provide great flexibility with respect to variation in softening point and penetration of the entire composition. More particularly, it has been found that a combination of aliphatic esters of dicarboxylic esters with organic silicates provides the desired degree of flexibility with respect to varying the softening point-penetration relationship. This type of composition is illustrated in Table I below. In the compositions outlined in the table, an air-blown bulk distillate was used as the asphaltic component. To this was added a typical diester, namely, a bis(2-ethylhexyl)sebacate, and mixtures thereof with a typical silicate, namely, tetrakis(2-ethylhexyl)silicate. It will be seen from the data contained in Table I that the softening point of the composition was reduced substantially by the addition of the diester, but that nearly half of this decrease in softening point was eliminated by replacing half of the diester with the silicate. Furthermore, when the proportion of the silicate was still further increased, the softening point of the resulting composition was actually higher than that of the unmodified asphalt. Throughout the variation in the softening point of these compositions it will be noted, according to the table, that the penetration showed substantially little variation.

Table 1

MODIFICATION OF AIR-BLOWN ASPHALT FROM BULK DISTILLATE

| Sample | Plasticizing agent | Softening point, °F. | Penetration, 100 g., 5 sec., 77° F. | Penetration index [1] | Flex Test at —10° F. |
|---|---|---|---|---|---|
| A | None | 275 | 11 | 6.3 | Brittle. |
| B | 20% bis(2-ethylhexyl) sebacate. | 210 | 68 | 7.4 | Flexible. |
| C | 10% bis(2-ethylhexyl) sebacate, 10% tetrakis(2-ethylhexyl) silicate. | 249 | 58 | 8.8 | Do. |
| D | 10% bis(2-ethylhexyl) sebacate, 20% tetrakis(2-ethylhexyl) silicate. | 292 | 43 | 9.8 | Do. |
| E | 30% mineral lubricating oil. | 298 | 35 | 8.9 | Brittle. |

[1] Penetration index, PI, is defined in the equation $$\frac{\text{Log 800, log pen at 25° C.}}{\text{Softening point, °C., 25° C.}} = \frac{1}{50} \cdot \frac{20-PI}{10+PI}$$

While the subject esters largely improve the properties of the bituminous compositions at low temperatures, these two-component blends still show too high a degree of flow (or low viscosity) at relatively elevated temperatures, in the order of about 350° F. or higher. Efforts to improve this property by a variation in the type and proportion of esters proved to be unsuccessful insofar as they were carried out. In order to provide compositions which would remain relatively stiff at temperatures of above about 350° F., attention was turned to the possibility of incorporating certain classes of gelling agents. Soaps were eliminated from consideration, due to the fact that while they provide gelling of lubricants and other materials at lower temperatures, nearly all of them melt at temperatures in the order of 350° F. or even substantially lower.

However, it was found that the use of substantially infusible colloidally dispersed gelling agents not only provided the improved higher consistency and lack of flowability at temperatures above 350° F., but also provided the compositions with a second means of controlling penetration of the composition at ordinary room temperature. This was true only when an appreciable amount of the infusible gelling agent was present. Smaller amounts of these substances can be incorporated in asphalts and the like to provide improved "hot temperature viscosity." However, the "hot temperature" contemplated in the latter use (e.g., as in road applications) is substantially lower than that encountered at a burning interface. Furthermore, in the amounts employed for raising the hot temperature viscosity, the penetration of the compositions is substantially unaffected. In order to be effective for the present purpose, these substantially infusible colloidal materials should be present in amounts from about 2% to about 10% based on the weight of the asphalt. However, any amount greater than about 2% may be employed in order to vary the consistency of the composition at a burning interface or to vary the penetration of the composition at ordinary room temperature.

GREASE-FORMING INORGANIC AND ORGANIC-INORGANIC GELS

Inorganic colloidal materials useful for the preparation of compositions according to the present invention may be roughly classified as relatively pure inorganic compounds, as naturally occurring materials and inorganic materials chemically treated to increase their compatibility with oleaginous material. The naturally occurring materials are mainly those of a clay-like nature and preferably comprise the swelling type bentonite clays. While the swelling type of clays are preferred, the non-swelling types such as Georgia kaolinite also may be used. Optimum compositons may be obtained by the use of magnesium montmorillonites, such as hectorite. The Wyoming montmorillonites, ordinarily regarded as aluminum montmorillonites, also are highly effective. In order to prepare a clay colloid suitable for use in these formations, it is ordinarily necessary to disperse the clay in water to form a finely divided aqueous suspension or dispersion of 1% to 10% clay concentration. This dispersion is then allowed to stand or is centrifuged so as to remove the non-colloidal gangue.

Synthetic materials having properties similar to the naturally occurring clays include those previously referred to above as "synthetic zeolites." The purposes for preparing and using synthetic clay-like substances are to avoid the presence of non-colloidal abrasive substance always found to be associated with crude clays and to have under close control the exact composition of the colloid, for example, the relative proportions of silica, alumina and sodium oxide (or other oxide) which may be varied within wide ratios. The preferred variety of synthetic zeolite comprises alumino-silicates which, as intimated above, may be regarded as compounds of alumina and silica containing varying ratios of sodium oxide. Other synthetic zeolites which may be used include compounds of magnesia with silica. It will be understood in accordance with the disclosures of the prior art that clays and zeolites may be utilized either in the form of their onium derivatives, or as simple inorganic colloids on the surfaces of which the hydrophobic surface active agent is adsorbed rather than reacted. Compositions gelled with clays bearing adsorbed amines are described in U.S. Patent 2,623,853. This type is preferred as contrasted to the compositons gelled with onium clays, due to the relatively lower emulsification characteristics of the resulting compositions. However, onium clay compositons have been found to be satisfactory as well for many purposes.

Onium clays are normally prepared by reaction of an onium compound such as a quaternary ammonium salt with a clay having a relatively high base exchange capacity, generally between about 25 and 100 milliequivalents of exchangeable base per 100 grams of clay. The onium compounds such as those described hereinafter are of such a type and are employed in such a proportion as to provide an onium clay reaction product capable of swelling to at least 8-fold in nitrobenzene. Compositions of this character are described in the Hauser patent, U.S. 2,531,427. Hence, in the specification and claims where reference is made to an inorganic colloid and a hydrophobic surface active agent is meant either this physical combination or the substantially equivalent chemical combination, namely the reaction products of clays or zeolites with onium compounds to produce onium clays or onium zeolites.

Inorganic amorphous colloids of a simpler and preferred variety include the inorganic oxides such as silica, alumina, magnesia, vanadium pentoxide, and ferric oxide, as well as the corresponding hydroxides, including lime, alkaline earth carbonates, such as calcium carbonate, as well as metallic sulfates and phosphates. It has been found, in fact, that a wide variety of inorganic compounds may be used as stiffening agents according to the present process as long as they are capable of hydrogel or hydrosol formation.

In addition to the colloidal materials defined hereinbefore, other suitable substances include colloidally dispersed carbons such as carbon black and phthalocyanine dye materials, particularly, copper phthalocyanine.

Table II which follows presents further illustrations of compositions coming within the present invention, showing not only the effect of various esters upon the softening point and penetration relationships of an air-blown short residue, but also the effect of adding to some of these compositons a typical substantially infusible gelling agent. In this particular case, an onium clay, namely, trimethylstearylammonium bentonite, was employed. Similar results may be obtained by the use of any of the other gelling agents referred to hereinbefore.

Table II
MODIFICATION OF AIR-BLOWN SHORT RESIDUE

| Sample | Plasticizing agent | Softening point, °F. | Penetration, 100 g., 5 sec., 77° F. | Penetration index | Flex Test at −10° F. |
|---|---|---|---|---|---|
| F | None | 304 | 20 | 8.4 | Brittle. |
| G | 20% bis(2-ethylhexyl) sebacate. | 215 | 173 | 11.0 | Flexible. |
| H | 18% bis(2-ethylhexyl) sebacate, 2% trimethylstearylammonium bentonite. | 242 | 86 | 9.7 | Do. |
| I | 30% tetrakis(2-ethylhexyl) silicate. | 242 | 120 | 11.0 | Do. |
| J | 27% tetrakis(2-ethylhexyl) silicate, 3% trimethylstearylammonium bentonite. | 293 | 72 | 11.0 | Do. |
| K | 15% bis(2-ethylhexyl) silicate, 15% tetrakis(2-ethylhexyl) silicate. | 200 | 274 | 12.0 | Very flexible. |
| L | Same as K, containing 3% of trimethylstearylammonium bentonite. | 249 | 145 | 11.5 | Do. |

The righthand column entitled "Flex test at −10° F." indicates that the original asphalt was extremely brittle at −10° F. This brittleness was not overcome by the incorporation of as much as 30% mineral lubricating oil. However, as the table shows, the incorporation of a like amount or even less of the various esters provided compositions with a flexible character even at this low temperature.

Additional materials (beside the essential components which must be present in the above-described amounts) may be incorporated for specific purposes. For example, supplementary fuel components or oxidizing agents or catalysts may be present where the composition is to be employed for burning purposes. Further modification in the plastic properties of the compositions may be made by incorporation of rubber or synthetic rubbers and polymers, such as polyvinyl chloride and the like.

These compositions may be prepared by a number of alternative procedures. The softer bituminous substances, having penetrations greater than about 5 and up to about 20 dmm. at 77° F., may be mixed readily with the modifying ester and gelling agent in a kneading machine to form a sandy composition which is then compressed in a suitable mill to form a relatively solid plastic shape. The gelling agents may also be dispersed in the ester prior to incorporation with the asphalt. It is essential that the gelling agents be sufficiently dispersed throughout the finished composition and are of a sufficient degree of fineness that the proper gelling or thickening action occurs. Preferably, the particle sizes of these gelling agents is no larger than about 100 millimicrons.

A second process for the preparation of these compositions comprises a modification of the "plastisol" process. This process is especially applicable where the relatively hard asphalts (having ASTM penetrations at 77° F. between about 0 and about 5 dmm.) are employed. In this case, the ester and hard asphalt are commingled together with the substantially infusible agent and thereafter the temperature is raised to an extent sufficient to cause the asphalt to disperse in the ester together with the gelling agent. In order to be effective the asphalt should be powdered to a fine particle size preferably in the order of less than about 20 microns. Table III which follows gives typical properties of compositions prepared by the plastisol process wherein the asphalt is a hard cracked asphalt having a 0 penetration at 77° F.

*Table III*

MODIFICATION OF HARD CRACKED ASPHALT

| Sample | Plasticizing agent | Softening point, °F. | Penetration, 100 g., 5 sec. 77° F. | Penetration index |
|---|---|---|---|---|
| M | None | 332 | 0 | |
| N | 40% bis(2-ethylhexyl)sebacate | 102 | 282 | 1.4 |
| O | 20% bis(2-ethylhexyl) sebacate, 20% tetrakis(2-ethylhexyl)silicate. | 183 | 80 | 6.2 |
| P | Same as O, plus 0.5% trimethylstearylammonium bentonite. | 190 | 75 | 6.6 |
| Q | 15% bis(2-ethylhexyl) sebacate, 25% tetrakis(2-ethylhexyl)silicate. | 238 | 123 | |

In addition to being especially useful in fuel compositions and the like, the materials of the present invention are suitable for use as sealing compounds, especially where a wide variation in temperatures is encountered.

I claim as my invention:

1. A bituminous composition comprising a bitumen having an ASTM penetration less than about 20 dmm. at 77° F., from about 20% to about 65% based on the weight of the bitumen of an organic ester of the group consisting of aliphatic esters of dicarboxylic acids, organic silicon esters, organic phosphorus esters and mixtures thereof, said ester having a pour point lower than about —40° F. and a boiling point higher than about 300° F. at 1 mm. Hg pressure and 2–10% by weight, based on the asphalt, of a substantially infusible colloidally dispersed gelling agent for said composition of the group consisting of hydrophilic inorganic bentonitic clays, hydrophobic ammonium clays, inorganic amorphous colloidal silica gelling agents, carbon black and phthalocyanine dyes.

2. A bituminous composition comprising an asphalt having an ASTM penetration less than about 20 dmm. at 77° F., from about 20% to about 65% based on the weight of the asphalt of an organic ester of the group consisting of aliphatic esters of dicarboxylic acids, organic silicon esters, organic phosphorus esters and mixtures thereof, said ester having a pour point lower than about —40° F. and a boiling point higher than about 300° F. at 1 mm. Hg pressure, and 2–10% by weight, based on the asphalt, of a substantially infusible colloidally dispersed gelling agent for said composition of the group consisting of hydrophilic inorganic bentonitic clays, hydrophobic ammonium clays, inorganic amorphous colloidal silica gelling agents, carbon black and phthalocyanine dyes.

3. A bituminous composition comprising an airblown asphalt having an ASTM penetration less than about 20 dmm. at 77° F., from about 20% to about 65%, based on the weight of the asphalt of an aliphatic ester of a dicarboxylic acid, said ester having a pour point lower than about —40° F. and a boiling point higher than about 300° F. at 1 mm. Hg pressure, and 2–10% by weight, based on the asphalt, of a substantially infusible colloidally dispersed gelling agent for said composition of the group consisting of hydrophilic inorganic bentonitic clays, hydrophobic ammonium clays, inorganic amorphous colloidal silica gelling agents, carbon black and phthalocyanine dyes.

4. A bituminous composition comprising a cracked asphalt having an ASTM penetration less than about 20 dmm. at 77° F., from about 20% to about 65%, based on the weight of the asphalt of an aliphatic ester of a dicarboxylic acid, said ester having a pour point lower than about —40° F. and a boiling point higher than about 300° F. at 1 mm. Hg pressure and 2–10% by weight, based on the asphalt, of a substantially infusible colloidally dispersed gelling agent for said composition of the group consisting of hydrophilic inorganic bentonitic clays, hydrophobic ammonium clays, inorganic amorphous colloidal silica gelling agents, carbon black and phthalocyanine dyes.

5. A bituminous composition comprising an asphalt having an ASTM penetration less than about 20 dmm. at 77° F., from about 20% to about 65% based on the weight of the asphalt of a mixture of a tetraalkyl silicate and an aliphatic ester of an aliphatic dicarboxylic acid, both esters having a pour point lower than about —40° F. and a boiling point higher than about 300° F. at 1 mm. Hg pressure and being present in an aliphatic ester: aliphatic silicate weight ratio between 1:1 and 1:2 and 2–10% by weight, based on the asphalt, of a substantially infusible colloidally dispersed gelling agent for said composition of the group consisting of hydrophilic inorganic bentonitic clays, hydrophobic ammonium clays, inorganic amorphous colloidal silica gelling agents, carbon black and phthalocyanine dyes.

6. A bituminous composition comprising a bitumen having an ASTM penetration less than about 20 dmm. at 77° F., from about 20% to about 65% by weight of a mixture of organic esters, said mixture comprising an organic silicate and an aliphatic ester of a dicarboxylic acid, the mixture having a pour point lower than about —40° F. and a boiling point higher than about 300° F. at 1 mm. Hg pressure and 2–10% by weight, based on the asphalt, of a substantially infusible colloidally dispersed gelling agent for said composition of the group consisting of hydrophilic inorganic bentonitic clays, hydrophobic ammonium clays, inorganic amorphous colloidal silica gelling agents, carbon black and phthalocyanine dyes.

7. A bituminous composition comprising an asphalt having an ASTM penetration less than about 20 dmm. at 77° F., from about 20% to about 65% by weight of the asphalt of a mixture of an aliphatic ester of a dicarboxylic acid and an aliphatic silicate, both esters having a pour point lower than about —40° F. and a boiling point higher than about 300° F. at 1 mm. Hg pressure and being present in an aliphatic ester: aliphatic silicate weight ratio between 1:1 and 1:2 and 2–10% by weight, based on the asphalt, of a colloidally dispersed organophilic clay, originally exhibiting a base-exchange capacity of at least 25 in which the exchangeable organic cation has been exchanged for an onium ammonium base of a type capable of and to an extent sufficient to form an onium clay swelling at least 8-fold in nitrobenzene.

8. A bituminous composition comprising an asphalt having an ASTM penetration less than about 20 dmm. at 77° F., from about 20% to about 65% based on the weight of the asphalt of an organic ester of the group consisting of aliphatic esters of dicarboxylic acids, organic silicon esters, organic phosphorus esters and mixtures thereof, said ester having a pour point lower than about —40° F. and a boiling point higher than about —300° F. at 1 mm. Hg pressure and 2–10% by weight, based on the asphalt, of colloidally dispersed inorganic amorphous carbon black.

9. A bituminous composition comprising an asphalt having an ASTM penetration less than about 20 dmm. at 77° F., from about 20% to about 65% based on the weight of the asphalt of an organic ester of a dicarboxylic acid and a monohydric alcohol having a pour point lower than about —40° F. and a boiling point higher than about —300° F. at 1 mm. Hg pressure and 2–10% by weight, based on the asphalt, of colloidally dispersed silica.

10. A bituminous composition comprising a blown asphalt having an ASTM penetration less than about 20 dmm. at 77° F., from about 20% to about 65% based on the weight of the asphalt of bis(2-ethylhexyl)- sebacate and 2–10% by weight, based on the asphalt, of trimethylstearylammonium bentonite colloidally dispered therethrough.

11. A bituminous composition comprising a blown asphalt having an ASTM penetration less than about 20 dmm. at 77° F., from about 20% to about 65% based on the weight of the asphalt of an aliphatic organic silicate having a boiling point above about 300° F. at 1 mm. Hg, and 2–10% by weight, based on the asphalt, of trimethylstearylammonium bentonite colloidally dispersed therethrough.

12. A bituminous composition comprising an asphalt having an ASTM penetration less than about 20 dmm. at 77° F., from about 20% to about 65% by weight based on the asphalt of a mixture of tetrakis(octyl)silicate and bis(2-ethylhexyl)sebacate and 2–10% by weight, based on the asphalt, of dimethyldicetyl ammonium bentonite.

References Cited in the file of this patent

UNITED STATES PATENTS

| | | |
|---|---|---|
| 1,955,355 | Alvarado et al. | Apr. 17, 1934 |
| 2,048,799 | Lawson | July 28, 1936 |
| 2,404,208 | Bangham et al. | July 16, 1946 |
| 2,442,707 | Olson et al. | June 1, 1948 |
| 2,592,564 | Hardman | Apr. 15, 1952 |
| 2,661,301 | Capell | Dec. 1, 1953 |

FOREIGN PATENTS

| | | |
|---|---|---|
| 1,005,929 | France | Apr. 17, 1952 |